United States Patent [19]
Auyeung et al.

[11] Patent Number: 5,506,686
[45] Date of Patent: Apr. 9, 1996

[54] METHOD AND DEVICE FOR DETERMINING BIT ALLOCATION IN A VIDEO COMPRESSION SYSTEM

[75] Inventors: Cheung Auyeung, Hoffman Estates; Stephen N. Levine, Itasca, both of Ill.; James J. Kosmach, Atlanta, Ga.

[73] Assignee: Motorola, Inc., Schaumburg, Ill.

[21] Appl. No.: 344,251

[22] Filed: Nov. 23, 1994

[51] Int. Cl.$^6$ .............................. H04N 1/417; H04N 7/12
[52] U.S. Cl. ...................... 358/261.2; 358/426; 358/430; 382/232; 382/238; 348/384; 348/394; 348/409
[58] Field of Search ................................. 358/426, 261.1, 358/261.2, 430, 467, 479, 539; 382/232, 236, 239, 245, 246, 238; 348/384, 387, 390, 394, 401, 409, 412, 415

[56] References Cited

U.S. PATENT DOCUMENTS

| | | | |
|---|---|---|---|
| 4,984,076 | 1/1991 | Watanabe et al. | 348/408 |
| 5,134,476 | 7/1992 | Aravind et al. | 348/390 |
| 5,223,949 | 6/1993 | Honjo | 358/426 |
| 5,263,100 | 11/1993 | Kim et al. | 358/261.2 |
| 5,301,032 | 4/1994 | Hong et al. | 358/261.2 |
| 5,309,232 | 5/1994 | Hartung et al. | 348/384 |
| 5,327,502 | 7/1994 | Katata et al. | 382/239 |
| 5,416,604 | 5/1995 | Park | 358/426 |

*Primary Examiner*—Scott A. Rogers
*Assistant Examiner*—Thomas D. Lee
*Attorney, Agent, or Firm*—Darleen J. Stockley

[57] ABSTRACT

The present invention provides a method (100) and device (200) for allocating bits to video pictures in a video compression system. A sequence of video frames or pictures is received, and the number of bits used to compress a previously encoded frame and a signal-to-noise ratio for the immediately previously encoded video frame are determined. Rate distortion model parameters are updated. Then, first, second, and third deviations are determined. Finally, the bit allocation for the frame is determined based on the first number of bits used to compress a previously encoded frame, the first deviation, the second deviation, and the third deviation.

28 Claims, 5 Drawing Sheets

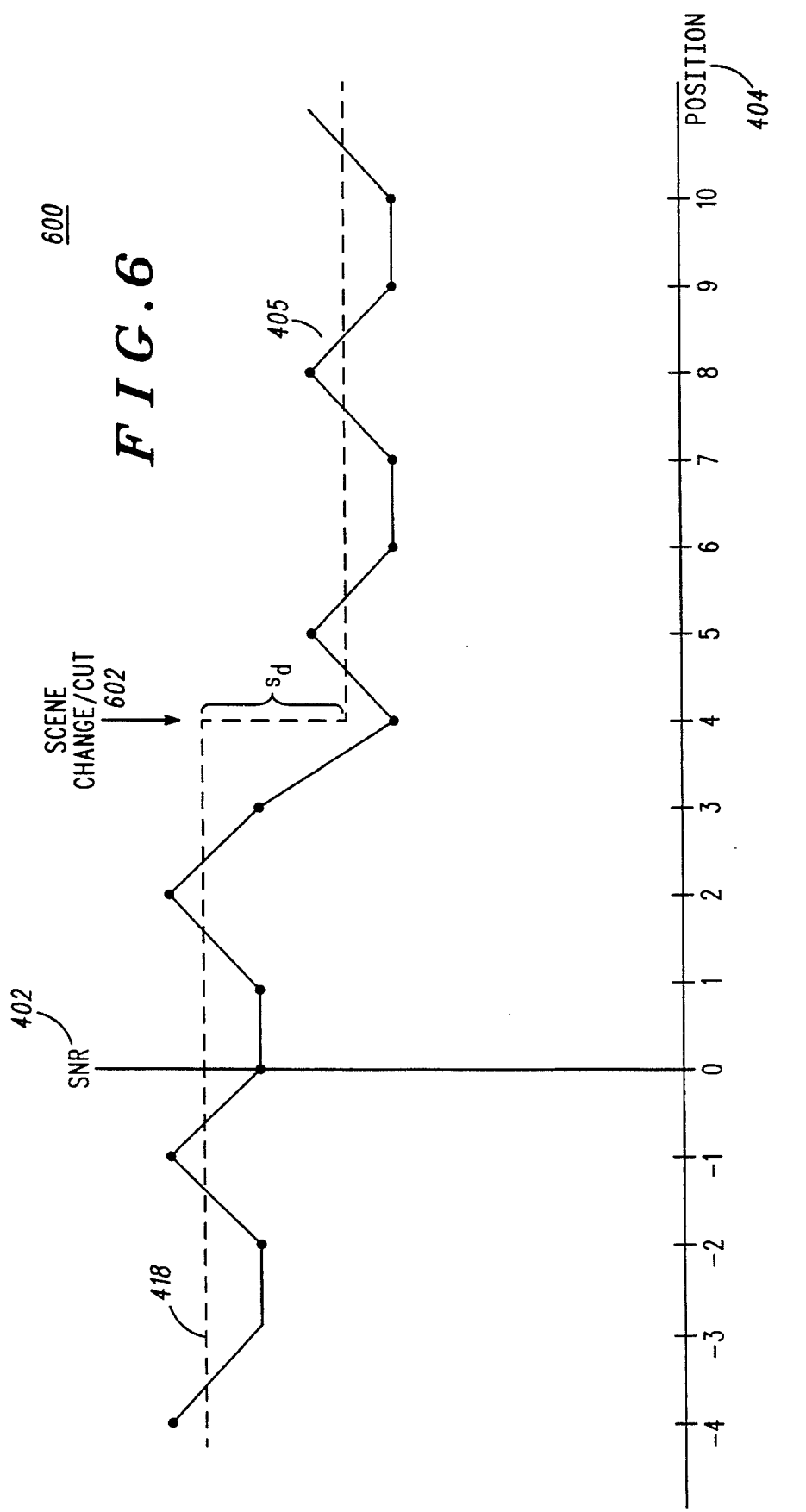

5,506,686

METHOD AND DEVICE FOR DETERMINING BIT ALLOCATION IN A VIDEO COMPRESSION SYSTEM

FIELD OF THE INVENTION

The invention relates generally to the field of video compression, and in particular, to determining bit allocation in a video compression system.

BACKGROUND OF THE INVENTION

Video systems are known to include a plurality of communication devices and communication channels, which provide the communication medium for the communication devices. For example, the communication channel may be wireline connections or RF frequency carriers. To increase the efficiency of the video system, video that needs to be communicated over the communication medium is digitally compressed. The digital compression reduces the number of bits needed to represent the video while maintaining perceptual quality of the video. The reduction in bits allows more efficient use of channel bandwidth and reduces storage requirements. To achieve digital video compression, each communication device may include an encoder and a decoder. The encoder allows a communication device to compress video before transmission over a communication channel. The decoder enables the communication device to receive compressed video from a communication channel and render it visible. Communication devices that may use digital video compression include high definition television transmitters and receivers, cable television transmitters and receivers, video telephones, computers and portable radios.

Several standards for digital video compression have emerged, including International Telecommunications Union, ITU, -T Recommendation H.261, the International Standards Organization/International Electrotechnical Committee, ISO/IEC, 11172-2 International Standard, MPEG-1, and the forthcoming ISO/IEC 13818-2 standard, MPEG-2. These standards designate the requirements for a decoder by specifying the syntax of a bit stream that the decoder must decode. This allows some flexibility in the creation of the encoder, but the encoder must be capable of generating a bit stream that meets the specified syntax and decoder model.

To maximize usage of the available channel bandwidth and the quality of the video, the encoder seeks to match the number of bits it generates to the available channel bandwidth. This is often accomplished by selecting a target number of bits to be used for the representation of a video frame or picture. The target number of bits is referred to as the bit allocation. A further consideration for the encoder in generating bits is the capacity of any buffers in the system. Generally, since the bit rates of the encoder, decoder, and the channel are not constant, there are buffers placed at both ends of the channel, one following the encoder prior to the channel and one at the end of the channel preceding the decoder. The buffers absorb the fluctuation in bit rates. The encoder often must insure that the buffers at the encoder and decoder will not overflow or underflow as a result of the bit stream generated.

Generally, and in particular in the case of emerging video compression standards, more than one picture type is used for encoding the pictures. For example, MPEG uses intracoded pictures, predicted pictures, and bidirectionally predicted pictures. Intracoded pictures use only the information contained within the current picture itself for encoding. Predicted pictures use the current picture and the previously encoded frame as a reference to encode the current picture. By using a previously encoded picture as a reference, fewer bits are generally generated since only differences between the current picture and the previously encoded picture need to be encoded. Similarly bidirectionally encoded pictures may use a past and/or previously encoded picture as a reference in addition to the current picture to encode the current picture. The different picture types inherently generate a varying number of bits. Since intracoded pictures do not use a reference picture for creating the current picture, they inherently use more bits than a bidirectionally encoded picture, and predicted pictures generally generate more bits than bidirectionally encoded pictures but less bits than intracoded pictures. The different picture types add a level of complexity to the problem of matching the encoder rate to the channel rate since different pictures inherently need to use more or less bits. If the encoder used only one picture type, then the encoder could force the bit allocation for each picture to an average which matches the channel rate. Where there are varying picture types with inherently different bit rates, forcing each picture to conform to one average would destroy quality by forcing the intracoded pictures to have a lower bit allocation and forcing the bidirectionally encoded pictures to have a higher bit allocation.

Therefore, a need exists for a method and device for determining bit allocation for multiple picture type encoding such that the average bit rate of the encoder is compatible with the channel bit rate and such that good visual quality is achieved and maintained.

BRIEF DESCRIPTION OF THE DRAWINGS

FIG. 6 illustrates a graphical depiction of the effect of a scene change on a video cyclic variation.

DESCRIPTION OF A PREFERRED EMBODIMENT

The present invention provides a method for allocating bits to video pictures in a video compression system. This is accomplished on a frame by frame basis. A sequence of video frames or pictures is received. The number of bits used to compress a previously encoded frame is determined and rate-distortion model parameters are updated. If no previous frames have been compressed, then a suitable estimate is used. Then a first deviation is determined based on at least the number of bits used to compress a previously encoded frame and a number of bits parameter that is related to the channel bit rate. A second deviation is then determined based on the desired picture quality, and a third deviation is determined based on a parameter derived from a predetermined relationship between changes in number of bits and changes in signal-to-noise ratio. Finally, the bit allocation for the frame is determined based on the first number of bits used to compress a previously encoded frame, the first deviation, the second deviation, and the third deviation. With such a method bits are allocated to each picture such that the average bit rate of the encoder output is maintained and good subjective visual picture quality at the decoder output is also maintained.

Figure 1:
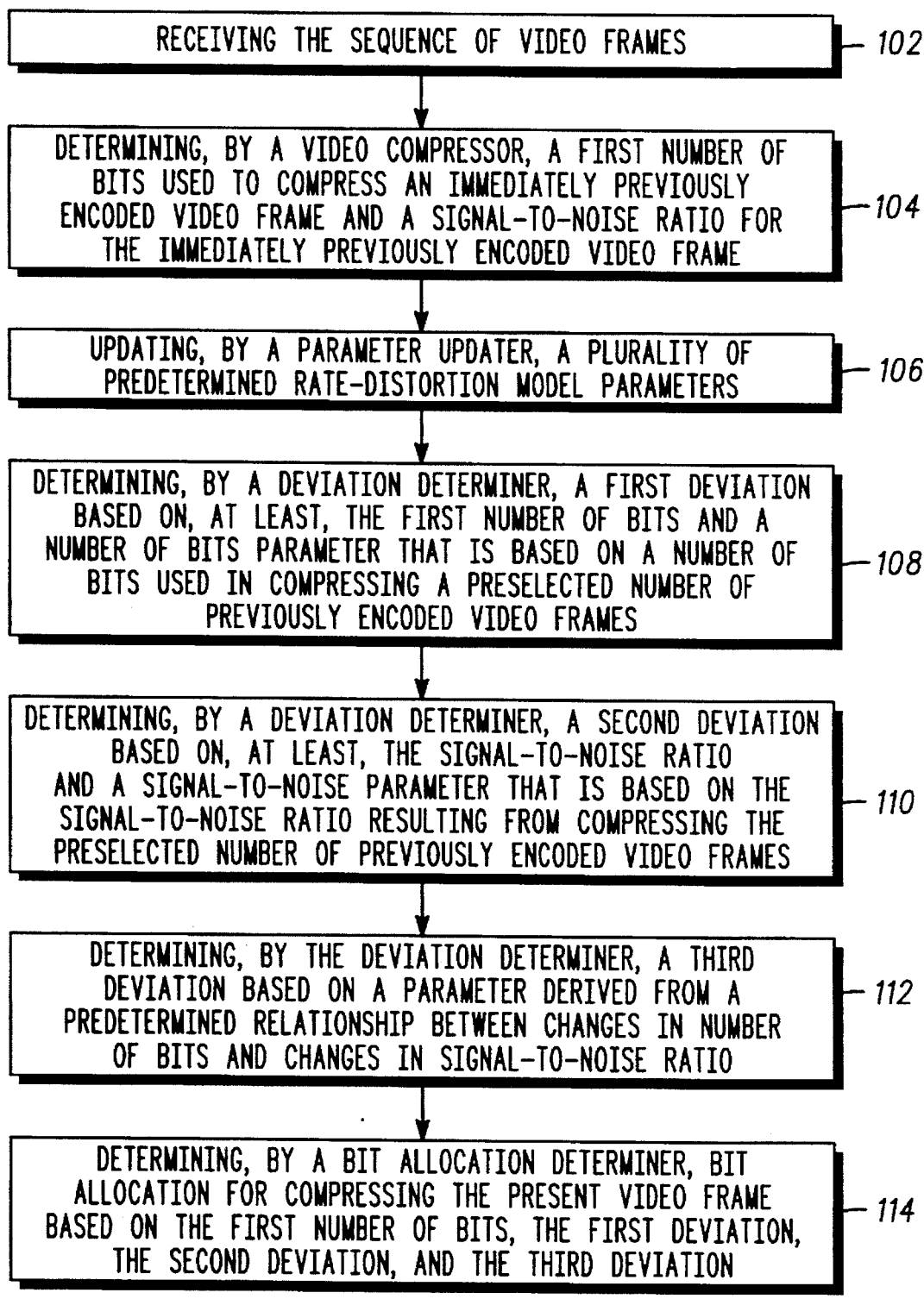
FIG. 1 is a flow diagram of steps for a method for determining bit allocation in accordance with the present invention.

The present invention is more fully described with reference to FIGS. 1–6. FIG. 1, numeral 100, is a flow diagram of steps for a method for determining bit allocation in accordance with the present invention. First, a sequence of video pictures is received (102). The sequence of video pictures is processed in a video compression system. A first number of bits used to compress an immediately previously encoded video frame and a signal-to-noise ratio for the immediately previously encoded video frame are determined (104). The parameters of a plurality of predetermined rate-distortion models are updated (106). A first deviation is determined based on, at least, the first number of bits and a number of bits parameter that is based on a number of bits used in compressing a preselected number of previously encoded video frames (108). A second deviation is determined based on, at least, the signal-to-noise ratio and a signal-to-noise parameter that is based on the signal-to-noise ratio resulting from compressing the preselected number of previously encoded video frames (110). A third deviation is determined based on a parameter derived from a predetermined relationship between changes in number of bits and changes in signal-to-noise ratio (112). The bit allocation for compressing the present video frame is determined based on the first number of bits, the first deviation, the second deviation, and the third deviation (114).

Each received video frame, i.e., picture, is classified into a picture type. For example, MPEG uses intracoded, I, pictures, predicted, P, pictures, and bidirectionally predicted, B, pictures. The picture type X will represent one of I, P, and B. The bit allocation, $R_X$, for picture type X is a sum of a first number of bits, $r_X$, and a first, second, and third deviation. More description of the method is given below.

Figure 2:
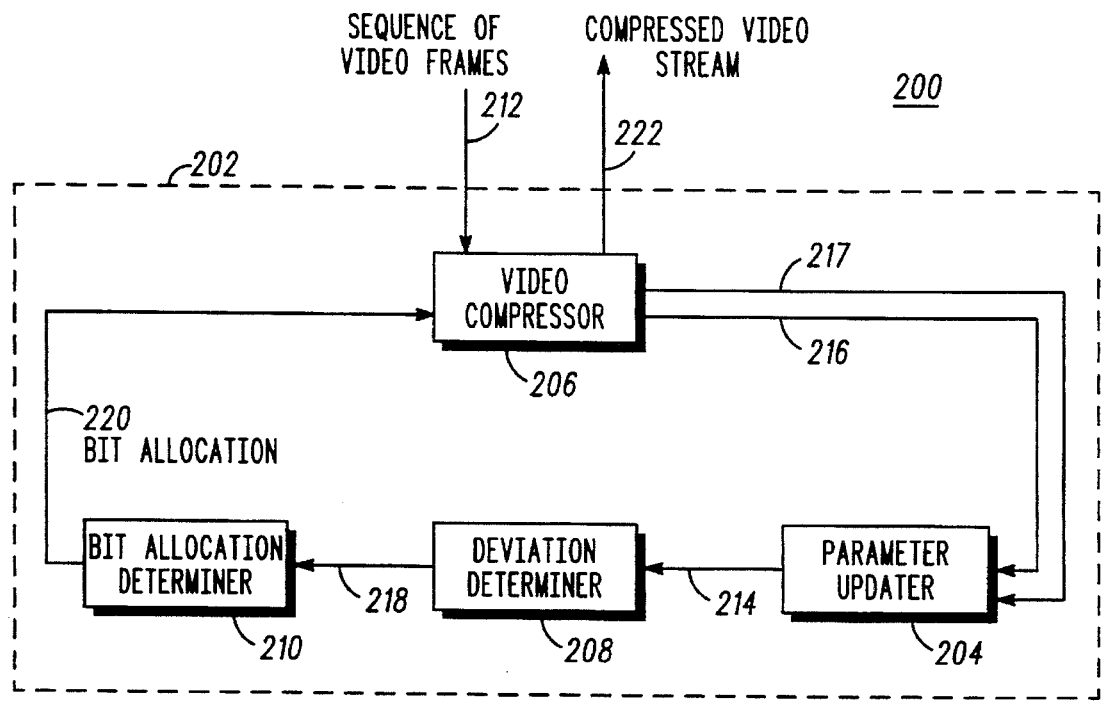
FIG. 2 is a block diagram of a video compression system including a device that determines bit allocation in accordance with the present invention.

FIG. 2, numeral 200, is a block diagram of a video compression system including a device that determines bit allocation in accordance with the present invention. The video compression system (202) comprises a parameter updater (204), a video compressor (206), a deviation determiner (208), and a bit allocation determiner (210).

The video compressor (206) compresses a sequence of video frames (212) based on a bit allocation (220) to provide a compressed video stream (222). The video compressor (206) also determines a first number of bits (216) used to compress an immediately previously encoded video frame and a signal-to-noise ratio for the immediately previously encoded video frame (217). The sequence of video frames (212) is a sequence of digital video pictures. The digital pictures may be progressively scanned as in the MPEG-1 standard. They may also be either interlaced or progressively scanned digital pictures as in MPEG-2. The parameter updater (204) generates updated parameters (214) of a plurality of predetermined rate-distortion models based on the first number of bits (216) and the signal-to-noise ratio for the immediately previously encoded video frame (217). The deviation determiner (208) determines a first, a second, and a third deviation (218) based on the updated parameters (214). The first deviation is based on, at least, the first number of bits and a number of bits parameter that is based on a number of bits used in compressing a preselected number of previously encoded video frames. The second deviation is based on, at least, the signal-to-noise ratio and a signal-to-noise parameter that is based on the signal-to-noise ratio resulting from compressing the preselected number of previously encoded video frames The third deviation based on a parameter derived from a predetermined relationship between changes in number of bits and changes in signal-to-noise ratio. Based on the first, second, and third deviations (218) the bit allocation determiner (210) generates the bit allocation (220) used by the video compressor (206). More description is given below.

Figure 3:
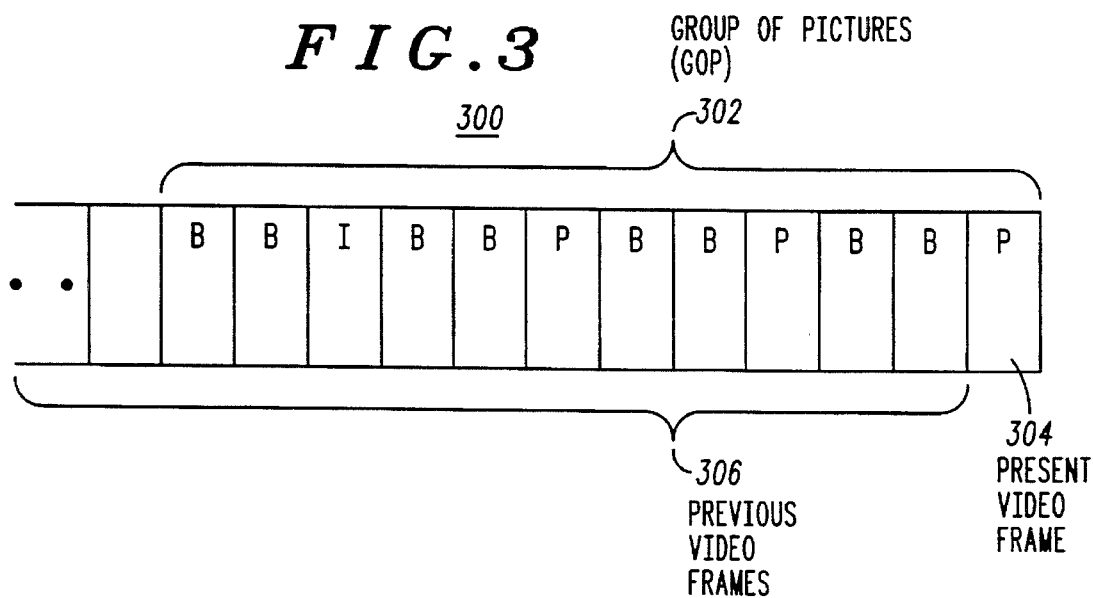
FIG. 3 is an exemplary sequence of video frames that may be encoded in accordance with the principles of the present invention.

FIG. 3, numeral 300, is an exemplary sequence of video frames that may be encoded in accordance with the principles of the present invention. The pictures in a picture sequence are classified into several picture types. For example, the pictures in MPEG-1 are classified into I, B, P-type, where I is intracoded, B is bidirectionally encoded, and P is predicted. The video compression system (202) then processes each picture according to its picture type. The video compression system (202) segments and reorders the picture sequence into a series of Group of Pictures, GOP, (302). Each GOP, in turn, contains a series of pictures. The GOP structure can be fixed for the whole picture sequence, or it can be changed dynamically within the picture sequence. A fixed GOP structure may be characterized by the number of I-pictures, $N_I$, the number of P-pictures, $N_P$, and the number of B-pictures, $N_B$, in a GOP. A preferred fixed GOP structure for MPEG-1, before reordering, includes a series of 12 pictures with consecutive picture types BBIBBPBBPBBP.

FIG. 3, numeral 300, also illustrates that at each time instance the reorders video sequence compressed by the compression system (202) contains a present video picture (304) received at that time instance and a set of previously encoded video pictures (306) encoded prior to that time instance. In a preferred implementation, the number of bits required to encode the present video picture (304) is based on the statistics collected from the previously encoded video pictures (306), such as the number bits used to compress a previously encoded video picture and the signal-to-noise ratio of previously encoded pictures.

Figure 4:
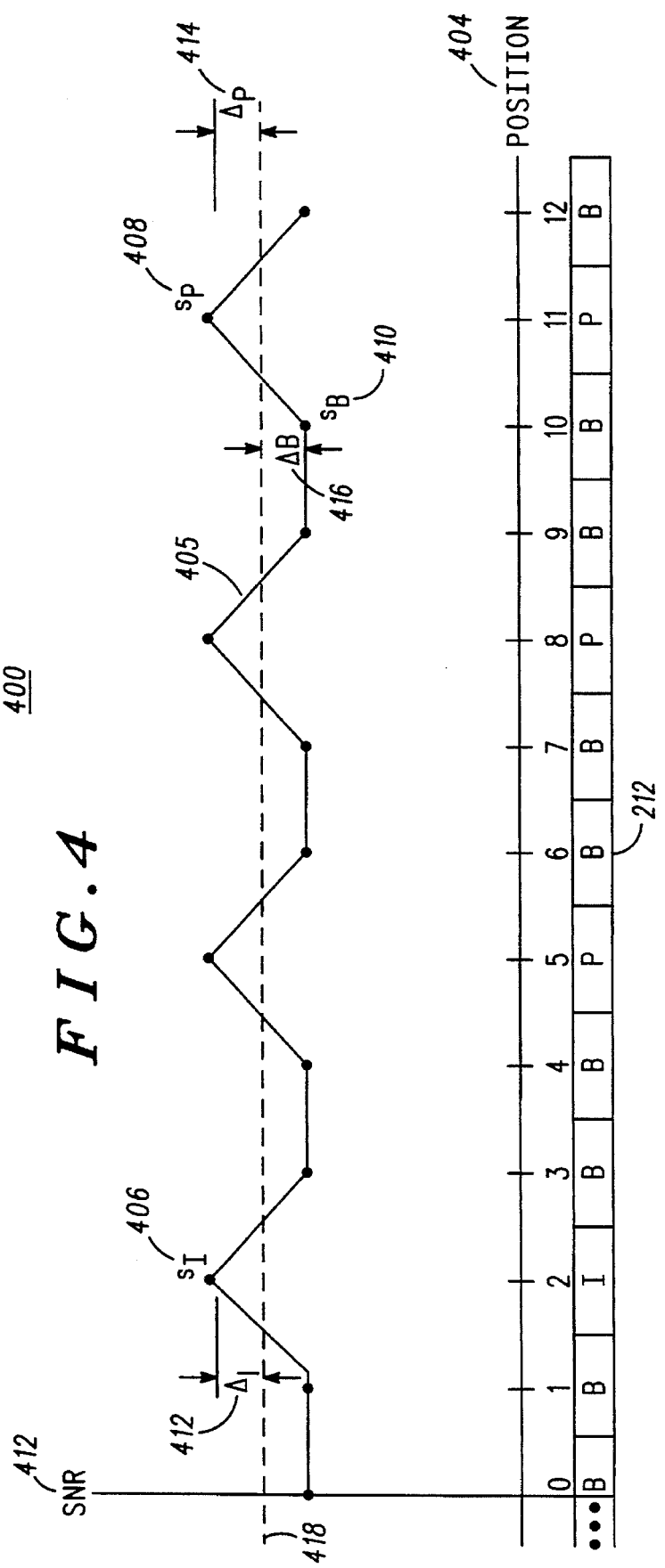
FIG. 4 is a graphical depiction of video cyclic variation that may be achieved in accordance with the principles of the present invention.

FIG. 4, numeral 400, is a graphical depiction of video cyclic variation that may be achieved in accordance with the principles of the present invention. Video cyclic variation is preferably used in the present invention to provide good visual quality. The signal-to-noise ratio, SNR, (402) in dB is shown as a video cyclic variation function (405) based on the position (404) of the sequence of video frames (212). The SNR of the I-picture $s_I$ (406) and the SNR of the P-picture $s_P$ (408) are higher than the SNR of the B-picture $s_B$ (410). The cyclic variation exploits the inherent difference in the number of bits generated by different picture types and also exploits that the human eye perceives only the peaks of the cyclic variation. The amount of cyclic variation is controlled by the relative amounts $\Delta_I$ (412), $\Delta_P$ (414), and $\Delta_B$ (416) that $s_I$ (406), $s_P$ (408), and $S_B$ (410) can deviate respectively from some common reference SNR (418). The preferred value for $\Delta_I$ (412), $\Delta_P$ (414), and $\Delta_B$ (416) is 0.5 dB.

Figure 5:
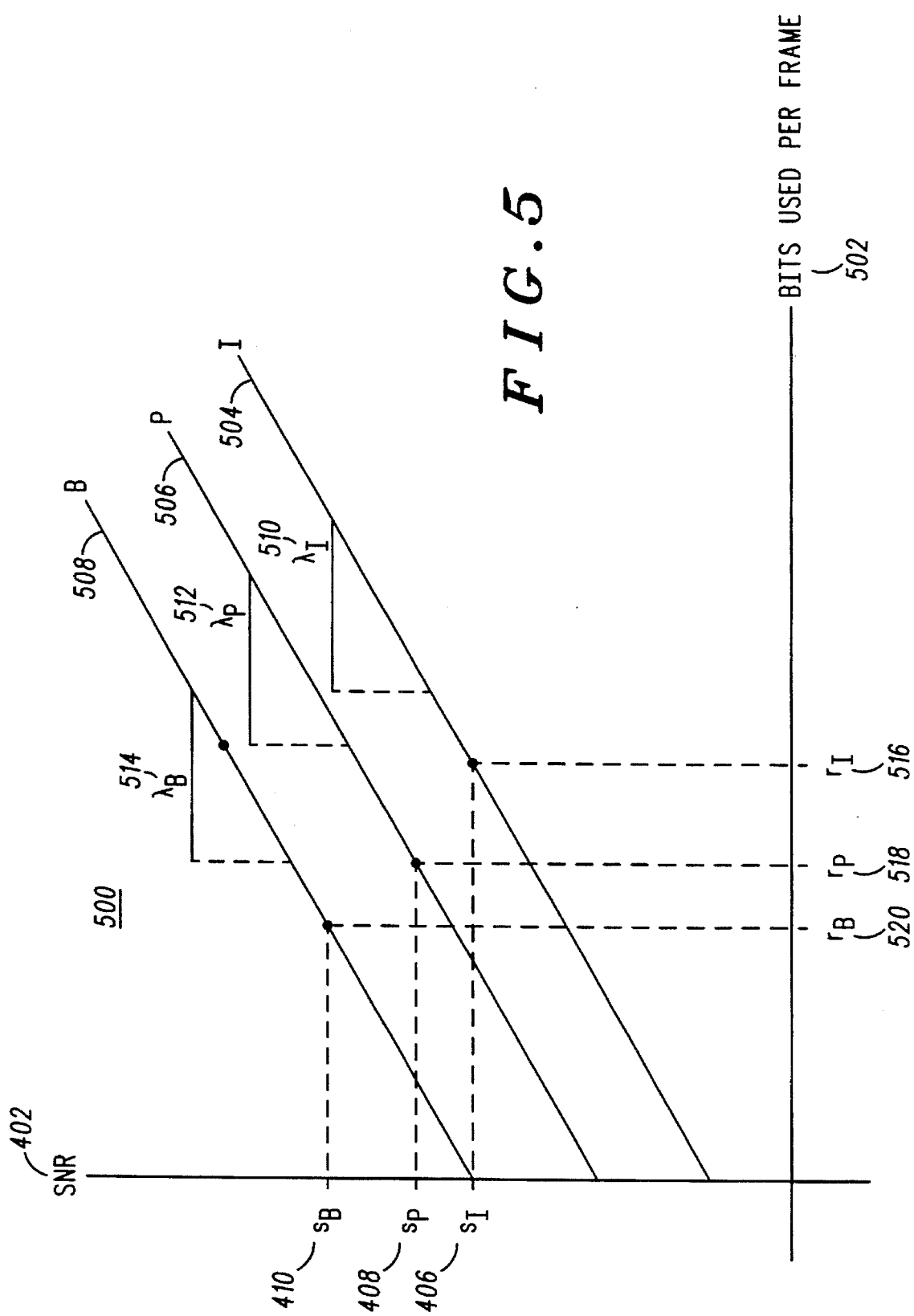
FIG. 5 shows, graphically, the preferred parametric rate-distortion models in accordance with the principles of the present invention.

FIG. 5, numeral 500, shows, graphically, the preferred parametric rate-distortion models in accordance with the principles of the present invention. The present invention controls the amount of picture quality variation and maximizes the overall picture quality of a video sequence by modeling the rate-distortion relationship for each picture with parametric models. The signal-to-noise ratio, SNR, (402) in dB is shown as a function of bits used per frame (502). The SNR (402) will be denoted as $S_X$ and the bits used per frame will be denoted as $R_X$, where X is one of I, P, and B. The preferred parametric rate-distortion models (504), (506), (508) for the I-pictures, P-pictures, and B-pictures respectively are shown. Each preferred parametric model is a straight line identified by its slope and a point on its line. The parametric model of the I-picture (504) is a straight line, $$S_I = \lambda_I(R_I - r_I) + s_I,$$

which is identified by its slope, $\lambda_I$, (510) and a point $(s_I, r_I)$ (406, 516) on the line. The parametric model of the P-picture (506) is a straight line, $$S_P = \lambda_P(R_P - r_P) + s_P$$

which is identified by its slope, $\lambda_P$, (512) and a point $(s_P, r_P)$ (408, 518) on the line. The parametric mode of the B-picture (508) is a straight line, $$S_B = \lambda_B(R_B - r_B) + s_B,$$

which is identified by its slope, $\lambda_B$, (514) and a point $(S_B, r_B)$ (410, 520) on the line. In a preferred implementation, the slopes of the parametric model are determined a priori, and the points are determined adaptively based on the statistics of the previously encoded video pictures (306). In a preferred implementation, the point $(s_P, r_P)$ is estimated to be $(s_P, r_P)$, the SNR and picture bit count measured from the nearest previously encoded P-picture. Similarly, the point $(s_B, r_B)$ is estimated to be $(S_b, r_b)$, the SNR and picture bit count measured from the nearest B-picture. Similarly, in a preferred implementation, the point $(s_I, r_I)$ is also determined from the nearest previously encoded I-picture.

FIG. 6, numeral 600, illustrates a graphical depiction of the effect of a scene change on a video cyclic variation. In a preferred implementation, the point $(s_I, r_I)$ (406,516) is adjusted to compensate for the effect of a scene change or scene cut. FIG. 6, numeral 600, shows the video cyclic variation function (405) which is a measure of SNR (402) as a function of the picture position (404). A scene change/cut (602) occurs at picture position number 4. The average SNR (418) is shown. After the scene change/cut (602), the SNR is changed by $s_d$ dB to a new average SNR.

With the illustration of the video cyclic variation (400), the parametric rate-distortion models (500), and the effect of scene change (600), the method (100) and device (200) for determining the bit allocation can be further described. The parameters $r_I$, $r_P$, $r_B$ (516, 518, 520) and $s_I$, $s_P$, $s_B$ (406,408, 410) of parametric models (500) are updated by the following equations:

$$r_I = r_i$$

$$r_P = r_P$$

$$r_S = r_S$$

$$s_I = s_i - (s_{P-1} - s_P)$$

$$s_P = s_P$$

$$s_B = s_b$$

where $r_I$, $r_P$, $r_B$ and $s_I$, $s_P$, $s_B$ are the number of bits and SNR measured from the nearest previously encoded pictures, and $s_{P-1}$ is the SNR measured from the previously encoded P-picture immediately prior to the previously encoded I-picture. If scene changes and scene cuts occur, the signal-to-noise ratios will be compensated. In a preferred implementation, the correction value Sd in dB is estimated to be $$s_d = s_{P-1} - s_P,$$

where $s_{P-1}$ is the measured SNR of the previously encoded P-picture immediately prior to the previously encoded I-picture. In order to compensate for the SNR change $s_d$, the point $(s_I, r_I)$ (406, 516) for the parametric model of the I-picture (509) is determined by $$s_I = s_i - s_d$$

and $$r_I = r_i,$$

where $(s_i, r_i)$ is the SNR and bit count measured from the nearest previously encoded I-picture.

The present invention allocates bits to the present video picture (304) by minimizing a weighted expected average distortion over one group of pictures, GOP, (302) and by keeping the expected average number of bits per GOP to be a given constant. The preferred weighted expected average distortion measure is $$\frac{N_I D_I}{\delta_I} + \frac{N_P D_P}{\delta_P} + \frac{N_B D_B}{\delta_B}$$

where the average distortion, $D_X$, per pixel is related to its SNR, $S_X$, in dB by $$S_X = 20\log_{10}\left(\frac{255}{D_X}\right).$$

and the weighting, $\delta_X$ is related to the relative amount of cyclic distortion $\Delta_X$ in dB by $$\Delta_X = 20\log_{10}\left(\frac{255}{\delta_X}\right).$$

The targeted average number of bits per GOP is $$N_I R_I + N_P R_P + N_B R_B = R$$

where $S_X$ and $R_X$ is related by the parametric models. As a result, the optimal bit allocation for the current picture is the sum of the first number of bits, the first deviation, the second deviation, and the third deviation. The bit allocation is $$R_X = r_X + dev_1 + dev_2 + dev_3$$

where X is the current picture type.

The first deviation results from the difference of the targeted average number of bits R and the updated average number of bits per GOP $N_I r_I + N_P r_P + N_B r_B$. The deviation is $$dev_1 = \frac{1}{\lambda_X}\left[\frac{R - (N_I r_I + N_P r_P + N_B r_B)}{\frac{N_I}{\lambda_I} + \frac{N_P}{\lambda_P} + \frac{N_B}{\lambda_B}}\right].$$

When $\lambda_I = \lambda_P = \lambda_B$, the deviation becomes $$dev_1 = \left[\frac{R - (N_I r_I + N_P r_P + N_B r_B)}{N_I + N_P + N_B}\right].$$

The first deviation increases the number of bits allocated to the current picture if the expected average number of bits per GOP is less than the targeted average number of bits per GOP.

The second deviation results from the difference of the normalized SNR, $S_X - \Delta_X$, and an estimated reference normalized SNR. The deviation is $$dev_2 = -\frac{1}{\lambda_X}\left[(S_X - \Delta_X) - \frac{\frac{N_I}{\lambda_I}(S_I-\Delta_I) + \frac{N_P}{\lambda_P}(S_P-\Delta_P) + \frac{N_B}{\lambda_B}(S_B-\Delta_B)}{\frac{N_I}{\lambda_I} + \frac{N_P}{\lambda_P} + \frac{N_B}{\lambda_B}}\right].$$

When $\lambda_I = \lambda_P = \lambda_B = \lambda$, the deviation becomes $$dev_2 = -\frac{1}{\lambda}\left[(S_X - \Delta_X) - \frac{N_I(S_I-\Delta_I) + N_P(S_P-\Delta_P) + N_B(S_B-\Delta_B)}{N_I + N_P + N_B}\right].$$

The deviation reduces the number of bits allocated to the current picture if the normalized SNR is higher than the reference normalized SNR. The second deviation provides a video cyclic variation.

The third deviation results from the various slopes of the parametric models.

$$dev_3 = -\frac{1}{\lambda_X}\left[\Lambda_X - \frac{\frac{N_I}{\lambda_I}\Lambda_I + \frac{N_P}{\lambda_P}\Lambda_P + \frac{N_B}{\lambda_B}\Lambda_B}{\frac{N_I}{\lambda_I} + \frac{N_P}{\lambda_P} + \frac{N_B}{\lambda_B}}\right]$$

where $\lambda_X$ such that $X \in \{I,P,B\}$ is related to $\Lambda_X$ by $$\Lambda_X = 20\log_{10}\left(\frac{255}{\lambda_X}\right).$$

When $\lambda_I = \lambda_P = \lambda_B = \lambda$, so that $\Lambda_I = \Lambda_P = \Lambda_B = \Lambda$, the deviation becomes zero. The deviation is a bias to compensate for the difference of the slopes of the parametric models. When the slopes are the same for all picture type, the deviation vanishes.

The present invention provides a method for allocating bits to video frames in a video compression system. The present invention can adapt quicker to the changing statistics of the video sequence such as a scene cut. It can also control the amount of SNR variations to provide good subjective visual picture quality, maximize the overall SNR to enhance average picture quality, and allocate bits to maintain the average bit rate. The present invention results in better picture quality than TM5 and SM3. Both TM5 and SM3 adapt slowly to the changing statistics of the video sequence. They also do not have direct means to control the amount of SNR variations and to enhance the average picture quality.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for determining bit allocation, for a present video frame of a sequence of video frames in a video compression system, the method comprising the steps of:

A) determining, by a video compressor upon receiving the sequence of video frames, a first number of bits used to compress an immediately previously encoded video frame and a signal-to-noise ratio for the immediately previously encoded video frame;

B) updating, by a parameter updater, a plurality of predetermined rate-distortion model parameters;

C) determining, by a deviation determiner, a first deviation based on, at least, the first number of bits and a number of bits parameter that is based on a number of bits used in compressing a preselected number of previously encoded video frames;

D) determining, by the deviation determiner, a second deviation based on, at least, the signal-to-noise ratio and a signal-to-noise parameter that is based on the signal-to-noise ratio resulting from compressing the preselected number of previously encoded video frames;

E) determining, by the deviation determiner, a third deviation based on a parameter derived from a predetermined relationship between changes in number of bits and changes in signal-to-noise ratio; and F) determining, by a bit allocation determiner, bit allocation for compressing the present video frame based on the first number of bits, the first deviation, the second deviation, and the third deviation.

2. The method of claim 1, wherein in step B), updating the plurality of predetermined rate-distortion model parameters includes compensating the signal-to-noise ratio for scene changes and scene cuts.

3. The method of claim 2, wherein compensating the signal-to-noise ratio for scene changes and scene cuts includes utilizing a correction value obtained from a change of signal-to-noise ratio over a predetermined number of video frames.

4. The method of claim 3 wherein the correction value is determined by an equation of a form:

$$s_d = s_{x-1} - s_x$$

where $s_d$ is the correction value expressed in dB, $s_{x-1}$ is a signal-to-noise ratio of a previously encoded video frame, and $s_x$ is a signal-to-noise ratio of a present video frame.

5. The method of claim 1, wherein the first deviation is a product of a predetermined bit-to-signal-to-noise ratio conversion factor and a difference between a targeted average number of bits and an updated average number of bits.

6. The method of claim 5, wherein the first deviation is determined by using an equation of a form:

$$dev_1 = \left[\frac{R - \Sigma_X(N_X \cdot r_X)}{\lambda_X \cdot \Sigma_X(N_X/\lambda_X)}\right]$$

where R is the targeted average number of bits, $N_X$ is a number of pictures of type X, $r_X$ is a number of bits for a picture of type X, and $\lambda_X$ is a slope of a parametric model of picture type X.

7. The method of claim 6, wherein the targeted average number of bits is adjusted according to a predetermined scheme for a plurality of picture types.

8. The method of claim 5, wherein the updated average number of bits is determined according to a predetermined scheme for a plurality of picture types using bit allocation from a preselected number of previously encoded video frames.

9. The method of claim 1, wherein the second deviation is a product of a predetermined bit-to-signal-to-noise ratio conversion factor and a distortion difference to provide a video cyclic variation.

10. The method of claim 9, wherein the second deviation is determined in accordance with an equation of a form:

$$dev_2 = -\frac{1}{\lambda_X}\left[(S_X - \Delta_X) - \frac{\Sigma_X((S_X - \Delta_X) \cdot N_X/\lambda_X)}{\Sigma_X(N_X/\lambda_X)}\right]$$

where $\lambda_X$ is a slope of a parametric model of picture type X, $N_X$ is a number of pictures of type X, $S_X$ is a signal-to-noise ratio, expressed in dB, for picture type X, and $\Delta_X$ is a cyclic distortion, expressed in dB, for picture type X.

11. The method of claim 9, wherein the distortion difference is a difference between a normalized signal-to-noise ratio of a previously encoded video frame in a predetermined number of video frames and a weighted estimated average normalized signal-to-noise ratio for the predetermined number of video frames.

12. The method of claim 1, wherein the third deviation is a product of a predetermined bit-to-signal-to-noise ratio conversion factor and a conversion factor parameter difference.

13. The method of claim 12, wherein the third deviation is determined utilizing an equation of a form:

$$dev_3 = -\frac{1}{\lambda_X}\left[\Lambda_X - \frac{\Sigma_X(N_X \cdot \Lambda_X/\lambda_X)}{\Sigma_X(N_X/\lambda_X)}\right]$$

$$\Lambda_X = 20\log_{10}(255/\lambda_X)$$

where $\alpha_X$ is a slope of a parametric model of picture type X and $N_X$ is a number of pictures of type X.

14. The method of claim 12, wherein the conversion factor parameter difference is a difference between a log value for the predetermined bit-to-signal-to-noise ratio conversion factor and a weighted average of a log value of predetermined conversion factors for a predetermined number of video frames.

15. A device for determining bit allocation, for a present video frame of a sequence of video frames in a video compression system, the device comprising:

A) a video compressor for, upon receiving the sequence of video frames, determining a first number of bits, wherein the first number of bits is used to compress an immediately previously encoded video frame and a signal-to-noise ratio for the immediately previously encoded video frame;

B) a parameter updater, operably coupled to the video compressor, for receiving the first number of bits and updating a plurality of predetermined rate-distortion model parameters;

C) a deviation determiner, operably coupled to the parameter updater, for:
  C1) determining a first deviation based on, at least, the first number of bits and a number of bits parameter that is based on a number of bits used in compressing a preselected number of previously encoded video frames;
  C2) determining a second deviation based on, at least, the signal-to-noise ratio and a signal-to-noise parameter that is based on the signal-to-noise ratio resulting from compressing the preselected number of previously encoded video frames;
  C3) determining a third deviation based on a parameter derived from a predetermined relationship between changes in number of bits and changes in signal-to-noise ratio;

D) bit allocation determiner, operably coupled to the deviation determiner and the video compressor, for determining bit allocation for compressing the present video frame based on the first number of bits, the first deviation, the second deviation, and the third deviation.

16. The device of claim 15, wherein in the parameter updater, updating the plurality of predetermined rate-distortion model parameters includes compensating the signal-to-noise ratio for scene changes and scene cuts.

17. The device of claim 16 wherein compensating the signal-to-noise ratio for scene changes and scene cuts includes utilizing a correction value obtained from a change of signal-to-noise ratio over a predetermined number of video frames.

18. The device of claim 17 wherein the correction value is determined by an equation of a form:

$$s_d = s_{x-1} - s_x$$

where $s_d$ is the correction value expressed in dB, $s_{x-1}$ is a signal-to-noise ratio of a previously encoded video frame, and $s_x$ is a signal-to-noise ratio of a present video frame.

19. The device of claim 15, wherein the first deviation is a product of a predetermined bit-to-signal-to-noise ratio conversion factor and a difference between a targeted average number of bits and an updated average number of bits.

20. The device of claim 19, wherein the first deviation is determined by using an equation of a form:

$$dev_1 = \left[\frac{R - \Sigma_X(N_X \cdot r_X)}{\lambda_X \cdot \Sigma_X(N_X/\lambda_X)}\right]$$

where R is the targeted average number of bits, $N_X$ is a number of pictures of type X, $r_X$ is a number of bits for a picture of type X, and $\lambda_X$ is a slope of a parametric model of picture type X.

21. The device of claim 20, wherein the targeted average number of bits is adjusted according to a predetermined scheme for a plurality of picture types.

22. The device of claim 20, wherein the updated average number of bits is determined according to a predetermined scheme for a plurality of picture types using bit allocation from a preselected number of previously encoded video frames.

23. The device of claim 15, wherein the second deviation is a product of a predetermined bit-to-signal-to-noise ratio conversion factor and a distortion difference to provide a video cyclic variation.

24. The device of claim 23, wherein the second deviation is determined in accordance with an equation of a form:

$$dev_2 = -\frac{1}{\lambda_X}\left[(S_X - \Delta_X) - \frac{\Sigma_X((S_X - \Delta_X) \cdot N_X/\lambda_X)}{\Sigma_X(N_X/\lambda_X)}\right]$$

where $\lambda_X$ is a slope of a parametric model of picture type X, $N_X$ is a number of pictures of type X, $S_X$ is a signal-to-noise ratio, expressed in dB, for picture type X, and $\Delta_X$ is a cyclic distortion, expressed in dB, for picture type X.

25. The device of claim 23, wherein the distortion difference is a difference between a normalized signal-to-noise ratio of the previously encoded video frame in a predetermined number of video frames and a weighted estimated average normalized signal-to-noise ratio for the predetermined number of video frames.

26. The device of claim 15, wherein the third deviation is a product of a predetermined bit-to-signal-to-noise ratio conversion factor and a conversion factor parameter difference.

27. The device of claim 26, wherein the third deviation is determined utilizing an equation of a form:

$$dev_3 = -\frac{1}{\lambda_X}\left[\Lambda_X - \frac{\Sigma_X(N_X \cdot \Lambda_X/\lambda_X)}{\Sigma_X(N_X/\lambda_X)}\right]$$

$$\Lambda_X = 20\log_{10}(255/\lambda_X)$$

where $\lambda_X$ is a slope of a parametric model of picture type X and $N_X$ is a number of pictures of type X.

28. The device of claim 26, wherein the conversion factor parameter difference is a difference between a log value for the predetermined bit-to-signal-to-noise ratio conversion factor and a weighted average of a log value of predetermined conversion factors for a predetermined number of video frames.

* * * * *

UNITED STATES PATENT AND TRADEMARK OFFICE
CERTIFICATE OF CORRECTION

PATENT NO. : 5,506,686
DATED : April 9, 1996
INVENTOR(S) : Cheung Auyeung, Stephen Levine and James J. Kosmach It is certified that error appears in the above-indentified patent and that said Letters Patent is hereby corrected as shown below:

Column 9, line 27 "a$_x$" should read --$\hat{a}_x$--

Signed and Sealed this

Eighteenth Day of June, 1996

*Attest:*

BRUCE LEHMAN

*Attesting Officer          Commissioner of Patents and Trademarks*